United States Patent
Park et al.

(10) Patent No.: US 10,541,393 B2
(45) Date of Patent: Jan. 21, 2020

(54) BATTERY MODULE COMPRISING EXTERNAL MEMBERS COUPLED BY MEANS OF CLAMPINGTYPE COUPLING MEMBERS

(71) Applicant: LG Chem, Ltd., Seoul (KR)

(72) Inventors: Jin Hong Park, Daejeon (KR); Jae Hyeon Ju, Daejeon (KR); Bo Hyon Kim, Daejeon (KR); Sang Hyuk Ma, Daejeon (KR); Hyung Jun Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 97 days.

(21) Appl. No.: 15/762,836

(22) PCT Filed: Apr. 20, 2017

(86) PCT No.: PCT/KR2017/004227
§ 371 (c)(1),
(2) Date: Mar. 23, 2018

(87) PCT Pub. No.: WO2017/217652
PCT Pub. Date: Dec. 21, 2017

(65) Prior Publication Data
US 2018/0277803 A1 Sep. 27, 2018

(30) Foreign Application Priority Data
Jun. 15, 2016 (KR) .......... 10-2016-0074672

(51) Int. Cl.
*H01M 2/10* (2006.01)
*H01M 2/30* (2006.01)
(Continued)

(52) U.S. Cl.
CPC ....... *H01M 2/1016* (2013.01); *H01M 2/1077* (2013.01); *H01M 2/30* (2013.01); *H01M 10/425* (2013.01); *H01M 10/48* (2013.01)

(58) Field of Classification Search
CPC ..... H01M 2/1016; H01M 2/30; H01M 2/1077
See application file for complete search history.

(56) References Cited

U.S. PATENT DOCUMENTS 10,224,583 B2 * 3/2019 Kim .................. H01M 2/12
10,381,606 B2 * 8/2019 Kim .................. H01M 10/425
(Continued)

FOREIGN PATENT DOCUMENTS

CN       204834722 U    12/2015
EP       2479818 A1     7/2012
(Continued)

OTHER PUBLICATIONS

First Office Action dated May 7, 2019, from the Japanese Patent Office in counterpart Japanese application No. 2018-517531.
(Continued)

*Primary Examiner* — Stewart A Fraser
(74) *Attorney, Agent, or Firm* — Morgan, Lewis & Bockius LLP

(57) ABSTRACT

A battery cell assembly in which a plurality of electrically connected battery cells are arranged and first and second outer cover members each having a plate-type structure surrounding an outer surface of the battery cell assembly and coupled to each other by a fastening member in a state in which corners corresponding to each other are in contact with each other. Here, each of the first and second outer cover members includes at least one fastening groove having a slit shape, and the fastening grooves of the first and second outer cover members are perforated at positions corresponding to each other of corners contacting each other, and the (Continued)

first and second outer cover members are coupled to each other in such a manner that both side ends, which face each other, of the fastening member are respectively inserted into the fastening grooves in a clamping manner.

15 Claims, 7 Drawing Sheets

(51) Int. Cl.
  *H01M 10/48* (2006.01)
  *H01M 10/42* (2006.01)

(56) References Cited

U.S. PATENT DOCUMENTS

| | | | | |
|---|---|---|---|---|
| 2011/0177376 | A1* | 7/2011 | Maguire | H01M 2/1077 429/151 |
| 2013/0108909 | A1 | 5/2013 | Matsuo et al. | |
| 2013/0202926 | A1* | 8/2013 | Yoon | H01M 2/1022 429/82 |
| 2015/0024252 | A1* | 1/2015 | Seong | H01M 2/0237 429/153 |
| 2015/0311486 | A1* | 10/2015 | Kwag | H01M 2/1077 429/7 |
| 2015/0349306 | A1* | 12/2015 | Watanabe | H01M 2/04 429/56 |
| 2015/0380779 | A1 | 12/2015 | Kong et al. | |
| 2016/0111691 | A1 | 4/2016 | Garascia et al. | |

FOREIGN PATENT DOCUMENTS

| | | |
|---|---|---|
| EP | 2 581 963 A1 | 4/2013 |
| JP | 2002-042755 A | 2/2002 |
| JP | 2010-033796 A | 2/2010 |
| JP | 5601369 B2 | 10/2014 |
| JP | 2015-197974 A | 11/2015 |
| JP | 2015-225700 A | 12/2015 |
| KR | 10-1279416 B1 | 6/2013 |
| KR | 10-2014-0114551 A | 9/2014 |
| KR | 10-1441206 B1 | 9/2014 |
| WO | 2011-155559 A1 | 12/2011 |

OTHER PUBLICATIONS

Extended European Search Report dated Jan. 8, 2019, issued in corresponding European Patent Application No. 17813477.1.
International Search Report dated Jul. 21, 2017, for Application No. PCT/KR2017/004227.
Second Office Action dated Oct. 11, 2019, from the Japanese Patent Office in counterpart Japanese application No. 2018-517531.
First Office Action dated Aug. 24, 2019, from the Korean Patent Office in counterpart Korean application No. 10-2016-0074672.

* cited by examiner

BATTERY MODULE COMPRISING EXTERNAL MEMBERS COUPLED BY MEANS OF CLAMPINGTYPE COUPLING MEMBERS

TECHNICAL FIELD

The present application claims priority under 35 U.S.C. § 119 to Korean Patent Application No. 10-2016-0074672, filed on Jun. 15, 2016, and under 35 U.S.C. § 365 to PCT/KR2017/004227, filed on Apr. 20, 2017, the entire contents of which are hereby incorporated by reference.

The present disclosure relates to a battery module including an outer cover member coupled by a fastening member in a clamping manner.

BACKGROUND ART

Recently, as technical development and demands for mobile devices have increased, demands for rechargeable secondary batteries as energy sources are rapidly increasing, and thus more researches on the secondary batteries are being carried out to cope with such diverse demands. Also, the secondary batteries have attracted considerable attention as power sources for an electric vehicle (EV), a hybrid electric vehicle (HEV), and a plug-in hybrid electric vehicle (Plug-In HEV), which have been proposed as solutions for air pollution and the like caused by conventional gasoline and diesel vehicles that use fossil fuels.

Accordingly, the electric vehicle (EV) traveling using only a battery and the hybrid electric vehicle (HEV) using a battery with a conventional engine have been developed and partially have been commercialized. Although a nickel-metal hydride (Ni-HM) secondary battery among the secondary batteries is mainly used as a power source for EV and HEV, in resent years, researches on lithium secondary battery having high energy density, high discharge voltage, and output stability have been actively progressing and partially have been commercialized.

When such secondary batteries are used in devices or apparatuses that require high capacity, e.g., a power source or a power storage system for vehicles, the secondary battery necessarily has a form of a battery cell assembly or a battery module in which a plurality of battery cells are arranged.

In general, such battery cell assembly or battery module has a structure having improved stability by a plurality of outer cover members surrounding outer surfaces thereof so as to prevent deterioration in performance or degradation in stability caused by physical damages on the battery cells constituting the battery cell assembly or the battery module in various operation circumstances of the device or the apparatus.

FIGS. 1 and 2 are schematic exploded views illustrating various structures of a conventional battery module.

Firstly, referring to FIG. 1, a battery module 100 includes a battery cell assembly 110 and an outer cover member surrounding an outer surface of the battery cell assembly 110.

The battery cell assembly 110 has an overall hexahedral shape in which a plurality of battery cells 111 are arranged in a direction of one surface while being electrically connected to each other at electrode terminals 112.

The outer cover members 121 and 122 include a first packing member 121 and a second outer cover member 122.

The first and second outer cover members 121 and 122 are coupled to surround the rest outer surfaces except for first and second surfaces facing each other with reference to a protruding direction of the electrode terminal 112 of the battery cells 111 constituting the battery assembly 110.

The first outer cover member 121 has a plate-type structure bent in a ⊏-shape on a vertical cross-section so as to consecutively surround front, top, and bottom surfaces, which are disposed adjacent to each other, among the rest outer surfaces except for the first and second surfaces of the battery cell assembly 110.

The second outer cover member 122 has a single plate-type structure to surround the rest bottom surface except for the front, top, and bottom surfaces surrounded by the first outer cover member 121 among the rest outer surfaces except for the front and rear surfaces of the battery cell assembly 110.

The first and second outer cover members 121 and 122 are coupled through welding in a state in which corners 121a, 121b, 122a, and 122b corresponding to each other contact each other to form a structure surrounding the battery cell assembly 110.

Referring to FIG. 2, a first outer cover member 221 and a second outer cover member 222 forms a plate-type structure bent in a ∟-shape on a vertical cross-section to respectively surround one surface-and-a top surface and the other surface-and-a bottom surface, which are disposed adjacent to each other in a consecutive manner, among the rest outer surfaces except for the first and second surfaces facing each other of the battery assembly 210.

The rest structure except for the above-described structure is the same as that of the battery module in FIG. 1.

However, since the outer cover member is coupled to the battery cell assembly through welding while directly surrounding the outer surface of the battery cell assembly in a state in which an additional cover or a protection member is not disposed between the battery cell assembly and the outer cover member so that the battery module has a maximum capacity in a limited space, the battery cell assembly may be damaged by spark or missiles generated in a welding process.

Also, the damage on the battery cell assembly due to the spark may cause a risk such as explosion of the battery cell assembly and act as a factor making a poor working circumstance for a worker during working.

Furthermore, in the welding process of the outer cover member, a welded portion for minimizing such a limitation may not be easily determined. In this case, since time required for the welding to couple the outer cover members to each other increases, the time and costs required for manufacturing the battery module may also increase.

Thus, techniques for fundamentally solving the above-described limitations are highly demanded.

SUMMARY

The present disclosure is aimed to solve a limitation of the related art and a technical subject requested from the past.

As the inventors constitute the present application such that first and second outer cover members are coupled by a fastening member in a clamping manner, which will be described later, through implementing in-depth researches and repeat various experiments, the present disclosure may prevent damages on a battery cell assembly caused by missiles or spark that may be generated in a welding process for coupling the outer cover members to each other and fire and explosion of the battery cell assembly caused by the damages. Accordingly, safety on a working circumstance may be enhanced, and an additional design or a process for setting a welded portion may not be required. Thus, a battery module may be further easily manufactured, and, at the same time, the time and costs required for manufacturing the battery module may be saved, so that the present disclosure is completed.

In accordance with an exemplary embodiment, a battery module
includes:
a battery cell assembly in which a plurality of battery cells are arranged while being electrically connected; and
first and second outer cover members each having a plate-type structure surrounding an outer surface of the battery cell assembly and coupled to each other by a fastening member in a state in which corners corresponding to each other are in contact with each other,
each of the first and second outer cover members includes at least one fastening groove having a slit shape, and
the fastening grooves of the first and second outer cover members are perforated at positions corresponding to each other of corners contacting each other, and
the first and second outer cover members are coupled to each other in such a manner that both side ends, which face each other, of the fastening member are respectively inserted into the fastening grooves in a clamping manner.

Accordingly, the battery module in accordance with an exemplary embodiment may prevent damages on the battery cell assembly caused by missiles or spark that may be generated in a welding process for coupling the outer cover members and fire and explosion of the battery cell assembly caused by the damages. Thus, safety on a working circumstance may be enhanced, and an additional design or a process for setting a welding portion may not be required. Therefore, the battery module may be further easily manufactured, and time and costs required for manufacturing the battery module may be saved.

In one exemplary embodiment, the battery cell assembly may have a hexahedral structure in which a plurality of battery cells are arranged in a direction of one surface while facing each other, and
the first and second outer cover members may be coupled to surround the rest outer surfaces except for first and second outer surfaces facing each other with reference to a protruding direction of an electrode terminal of each of the battery cells among the outer surfaces of the battery cell assembly.

Here, an electric connection member electrically connected to the electrode terminal of the battery cell may be disposed on the first and second outer surfaces, which face each other, of the battery cell assembly. In more detail, the electric connection member may include a busbar for electrically connecting electrode terminals of the battery cells or an external input-output terminal for electrically connecting the battery module to an external device.

Accordingly, the battery module may be formed such that the first and second outer cover members are coupled in a state in which the battery cell assembly is firstly connected to the electric connection member at the electrode terminal or form such that the battery cell assembly is connected to the electric connection member at the electrode terminal through the opened first and second outer surfaces in a state in which the first and second outer cover member are firstly coupled to each other. Thus, interference between the members constituting the battery module may be prevented, and the battery module may be further easily manufactured.

In one exemplary embodiment, the first outer cover member may have a plate-type structure bent in a ⊏-shape on a vertical cross-section so as to consecutively surround three outer surfaces adjacent to each other among the rest outer surfaces except for the first and second outer surfaces of the battery cell assembly, and
the second outer cover member may have a single plate-type structure surrounding the rest one outer surface except for the three outer surfaces surrounded by the first outer cover member among the rest outer surfaces except for the first and second outer surfaces of the battery cell assembly.

In one exemplary embodiment, each of the first and second outer cover members may have a plate-type structure bent in a ∟-shape so as to consecutively surround two outer surfaces adjacent to each other among the rest outer surfaces except for the first and second outer surfaces of the battery cell assembly.

In other words, the first and second outer cover members are coupled to surround the rest four outer surfaces except for the first and second outer surfaces facing each other with reference to a protruding direction of the electrode terminal of the battery cell among the outer surfaces of the battery cell assembly having the hexahedral structure. Here, since the four outer surfaces are consecutively adjacent to each other, the first outer cover member may have a bent plate-type structure to consecutively surround three or two outer surfaces adjacent to each other, and the second outer cover member may have a single plate-type structure surrounding the rest one outer surface or a bent plate-type structure to consecutively surround two outer surfaces.

Accordingly, the total number of the outer cover members may be minimized, and, at the same time, the coupled portions of the outer cover members may be minimized. Thus, degradation in structural stability, which is generated at the coupled portion between the outer cover members may be effectively prevented.

Meanwhile, the first and second outer cover members may extend and be bent so that an end of at least one corner overlaps an end of the rest corner among the corners contacting each other.

Accordingly, since the first and second outer cover members are coupled in a state in which the corners contacting each other overlap with each other, the structural stability may be enhanced, and, at the same time, external foreign substances or moisture may be prevented from being introduced into the battery module.

In one exemplary embodiment, the fastening member may have a bent plate-type structure in correspondence to the corners of the first and second outer cover members, and
each of both ends of the fastening member, which are respectively inserted into fastening grooves of the first and second outer cover members, may have a hook structure bent inward to be prevented from being escaped from the fastening grooves.

As described above, the first and second outer cover members may be coupled in a clamping manner as both side ends of the fastening member are inserted into the fastening grooves perforated at positions corresponding the both side ends of the first and second outer cover members.

Here, as the fastening member has a bent plate-type structure in correspondence to the corners of the first and second outer cover members contacting each other, the fastening member is coupled to the corners in a close contact manner, and thus, the outer surface of the battery module may be further uniformly formed without excessive protrusion of the fastening member.

Also, as each of the both side ends of the fastening member has a hook structure bent inward, a state in which the both side ends are inserted into the fastening grooves of the first and second outer cover members may be stably maintained, and the ends may be prevented from being escaped even when an external physical impact is applied. Thus, the structural stability of the battery module may be effectively enhanced.

Also, the fastening member may be made of a metal material or a composite material, which has elasticity.

Accordingly, the both side ends of the fastening member having the hook structure may be further easily deformed and inserted in a process of being inserted into the fastening grooves. Also, since the fastening member is easily restored to an original shape in virtue of the elasticity, the fastening member may be effectively prevented from being deformed to be escaped from the fastening grooves.

Meanwhile, in a state in which one end of the fastening member is inserted into the fastening groove defined in the corner of the first or second outer cover members, as the other side end facing the one end is forcedly inserted into the fastening groove defined in the corner of the first or second outer cover member contacting the corner, the fastening member may be coupled to the fastening groove in a clamping manner.

As described above, since the fastening member is made of a material having elasticity, accordingly, the both side ends of the fastening member having the hook structure may be further easily deformed and inserted when being inserted into the fastening grooves of the first and second outer cover members.

Here, the both side ends of the fastening member may be respectively inserted into the fastening grooves of the first and second outer cover member in an order. In more detail, in a state in which one side end is inserted, the other side end that is inserted thereafter may have elasticity enough to be forcedly inserted to prevent the fastening member from being deformed to be escaped from the fastening grooves.

Here, the structure coupled through the clamping manner may represent a structure in which the first and second outer cover members are coupled and supported by using a predetermined pressure applied from the fastening member having a structure of tongs. In more detail, since the fastening member has the bent plate-type structure, the fastening member may close contact the corners of the first and second outer cover members, and, as the pressure is applied by the elasticity that is characteristic of the material, the coupling state between the first and second outer cover members may be stably maintained.

In one exemplary embodiment, the fastening groove may be spaced by a distance that is 1% to 20% of a width of one surface of the corresponding outer cover member from an end of each of the corners of the outer cover members contacting each other.

When the fastening groove is spaced less than 1% of the width of one surface of the corresponding outer cover member from the end of the corners of outer cover members contacting each other, as a surface area in which the fastening member faces the first and second outer cover members becomes too small, the coupling structure may not be stable, and the both side ends of the first and second outer cover members may not be easily inserted into the fastening grooves of the first and second outer cover members although the fastening member has elasticity.

On the contrary, when the fastening groove is spaced greater than 20% of the width of one surface of the corresponding outer cover member from the end of the corners of outer cover members contacting each other, as the fastening member becomes too large in size, although a relatively small physical impact is applied, the fastening member may be easily escaped from the fastening grooves of the first and second outer cover members due to the elasticity of the fastening member, and thus, the coupling structure may not be stably maintained.

Meanwhile, a groove having a shape corresponding to outer surfaces of the arranged battery cells so that the arrangement state of the battery cells may be fixed and supported in a state in which the battery cells constituting the battery cell assembly face each other is defined in an inner surface of at least one of the first and second outer cover members.

In more detail, when the battery cells are arranged to constitute the battery cell assembly, a predetermined groove is defined in a side surface of the battery cell assembly by the arranged battery cells.

Accordingly, as the groove corresponding to the groove defined in the side surface of the battery cell assembly is defined in the inner surface of the first and second outer cover members directly surrounding the outer surfaces of the battery cell assembly, the groove defined in the side surface of the battery cell assembly and the groove defined in the inner surfaces of the first and second outer cover members may be engaged with each other. Thus, the arrangement state of the battery cells may be stably fixed and supported, and, at the same time, an unnecessary space in the battery module due to the grooves defined in the side surface of the battery cell assembly may be minimally generated, so as to resultantly minimize a total size of the battery module. Also, the battery cell assembly may be constituted with higher density than that of a conventional battery module to increase a total capacity.

Also, at least one of the first and second outer cover members may include a reinforcement bead for reinforcing a strength of the outer cover member.

Accordingly, the outer cover members may maintain the structural stability even under external physical impact or stress applied from outside the first and second outer cover members.

In one exemplary embodiment, at least one of the first and second outer cover members may include at least one opening so that the outer cover member is exposed to the outside in a state in which an external device electrically connected to the battery cell assembly is mounted.

Here, the external device may include at least one selected from the group consisting of a detector configured to detect abnormality of the battery cell assembly, a controller configured to control an electric connection state of the battery cell assembly, or a conversion regulator configured to convert and regulate a voltage and a current of the battery cell assembly.

Accordingly, since the battery cell assembly is connected to the external device in a state in which connection members for being connected to the external device are arranged in an inside of the first and second outer cover members instead of the outside thereof, the appearance of the battery module may be simplified.

Also, since the present disclosure provides a device including the battery module as a power source, the device may include one selected from the group consisting of a power tool, an electric vehicle, a hybrid electric vehicle, a plug-in hybrid electric vehicle, or a power storage device.

The device and the apparatuses are well known in the technical field of the present disclosure, detail description for this will not be provided.

DETAILED DESCRIPTION

Hereinafter, specific embodiments will be described in detail with reference to the accompanying drawings. The present disclosure may, however, be embodied in different forms and should not be construed as limited to the embodiments set forth herein.

Figure 1:
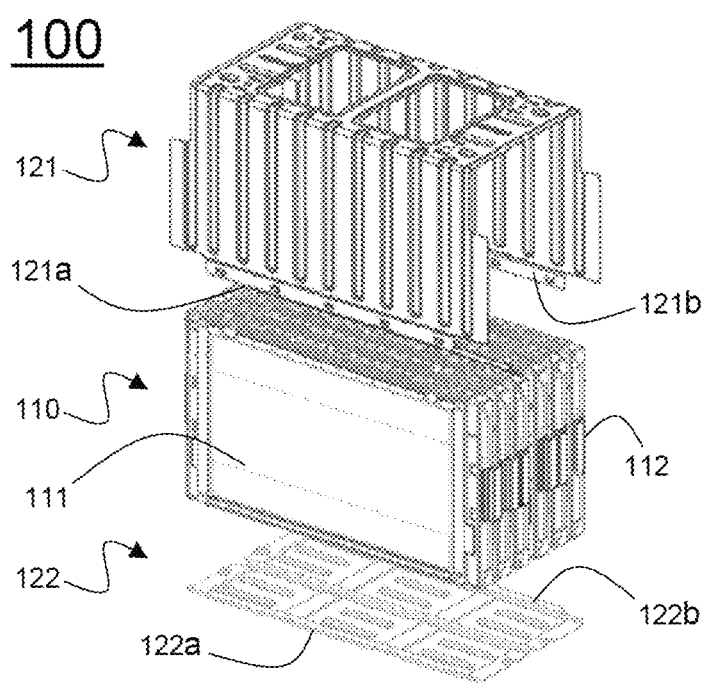
FIGS. 1 and 2 are schematic exploded views illustrating various structures of a conventional battery module.
Figure 2:
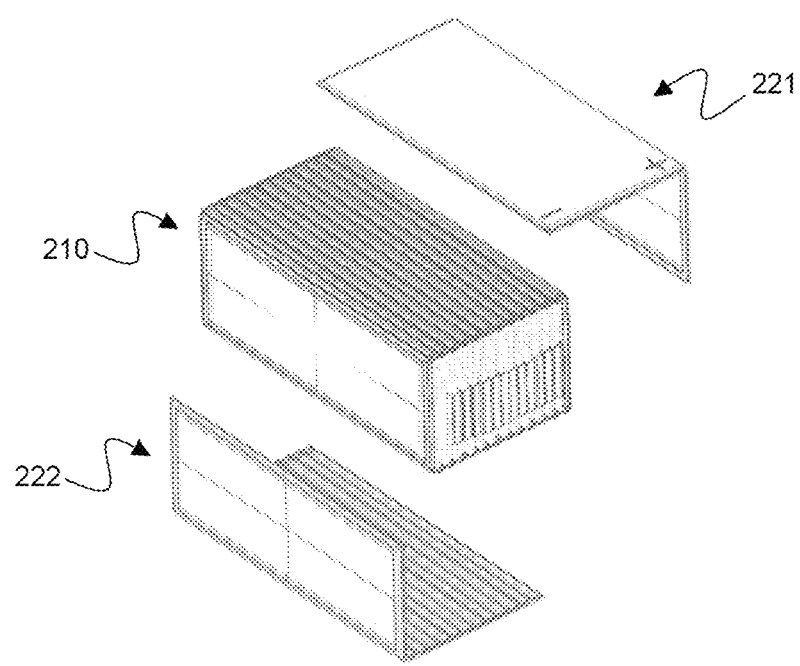
Figure 3:
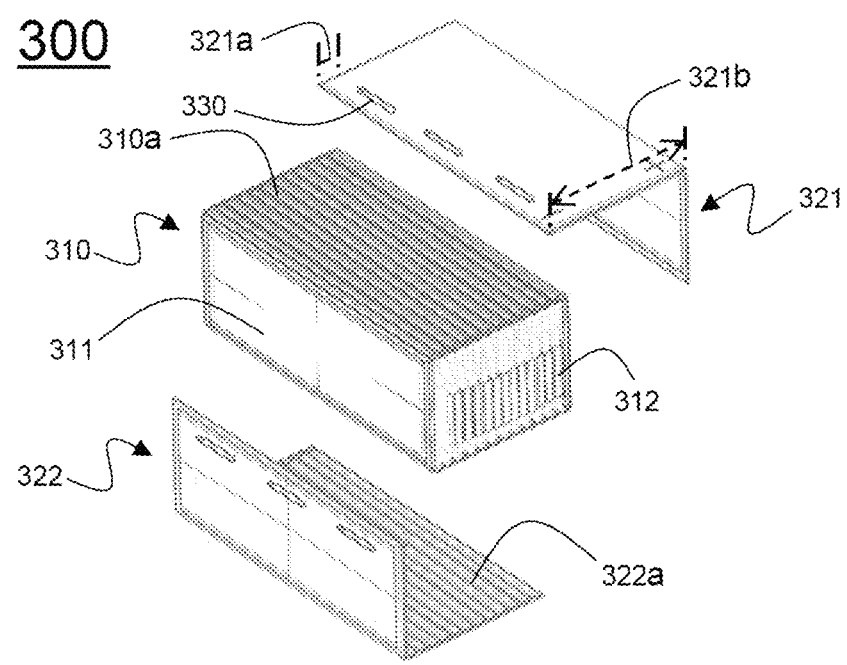
FIG. 3 is a schematic exploded view illustrating a structure of a battery module in accordance with an exemplary embodiment.
Figure 4:
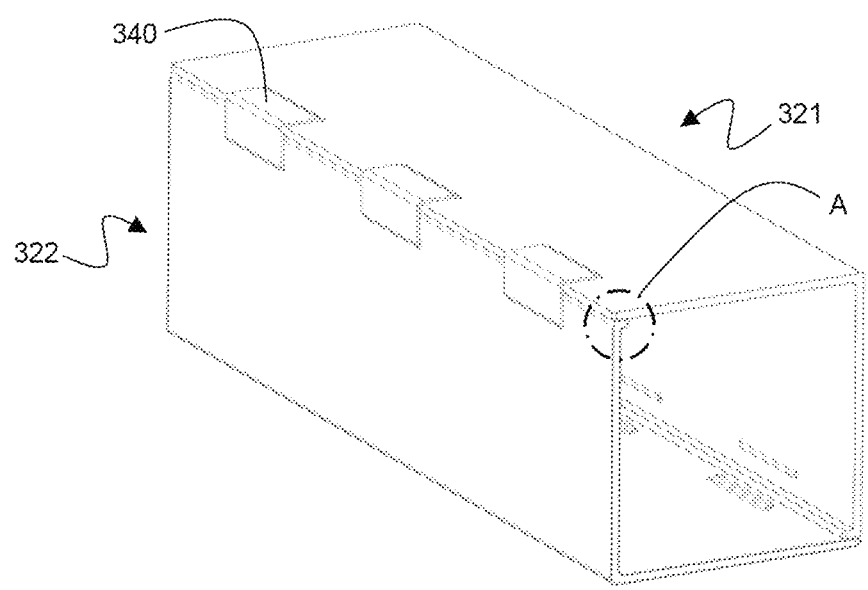
FIG. 4 is a schematic view illustrating a structure in which outer cover members in FIG. 3 are coupled by a fastening member.

FIG. 3 is a schematic exploded view illustrating a structure of a battery module in accordance with an exemplary embodiment, and FIG. 4 is a schematic view illustrating a structure in which outer cover members in FIG. 3 are coupled by a fastening member.

Referring to FIG. 3 in conjunction with FIG. 4, a battery module 300 includes a battery cell assembly 310 and outer cover members 321 and 322.

The battery cell assembly 310 has a structure in which a plurality of battery cells 311 are arranged in a direction of one surface and, overall, has a hexahedral structure. Due to the arrangement structure of the battery cells 311, grooves 310a are defined in top and bottom surfaces with reference to the ground.

The first outer cover member 321 and the second outer cover member 322 form a plate-type structure bent in a ㄴ-shape on a vertical cross-section so as to consecutively surround two outer surfaces adjacent to each other among the rest outer surfaces except for first and second outer surfaces facing each other with reference to a protruding direction of an electrode terminal 312 of the battery cells 311 constituting the battery cell assembly 310.

The first outer cover member 321 and the second outer cover member 322 directly surround the battery cell assembly 310, and the grooves 322a having a shape corresponding to that of the grooves 310a are defined in an inner surface directly contacting the top and bottom surfaces of the battery cell assembly 310 in which the grooves 310a are defined.

Accordingly, as the grooves 310a defined in the top and bottom surfaces of the battery cell assembly 310 and the grooves 322a defined in the inner surfaces of the first outer cover member 321 and the second outer cover member 322 are engaged with each other, the arrangement state of the battery cells 311 constituting the battery cell assembly 310 may be stably fixed and supported, and, at the same time, an unnecessary space in the battery module 300 due to the grooves 310a defined in the top and bottom surfaces of the battery cell assembly 310 may be minimally generated, so as to resultantly minimize a total size of the battery module 300.

Each of the first outer cover member 321 and the second outer cover member 322 includes a fastening groove 330 having a slit shape at corners thereof, which contact each other at positions corresponding to each other.

The fastening groove 330 defined in the first outer cover member 321 is spaced by a length 321a that is 12% of a width 321b of one surface of the first outer cover member 321 from an end of a corner of the first outer cover member 321.

Accordingly, as both ends of the fastening member 340 are inserted into the fastening grooves 330 in a state in which the corners corresponding each other contact each other, the first outer cover member 321 and the second outer cover member 322 may be more easily coupled and form a stable coupling structure in virtue of elasticity of the fastening member 340.

Figure 5:
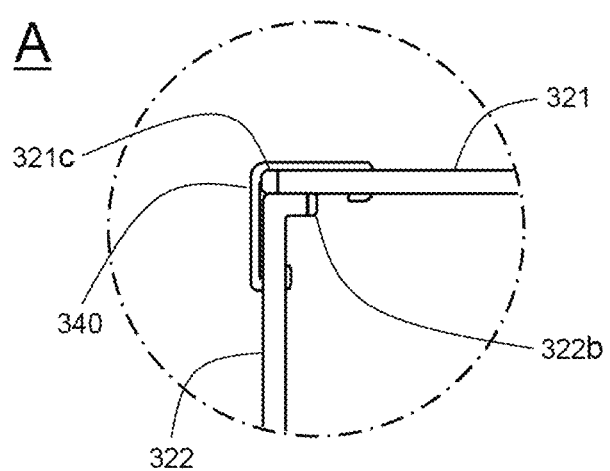
FIG. 5 is a schematic view illustrating a vertical cross-sectional structure of a portion A in FIG. 4.

FIG. 5 is a schematic view illustrating a vertical cross-sectional structure of a portion A in FIG. 4.

Referring to FIG. 5, the first outer cover member 321 and the second outer cover member 322 are coupled to each other by the fastening member 340 in a state in which corners 321c and 322b corresponding to each other are in contact with each other.

The corner 322b of the second outer cover member 322 overlaps the corner 321c, which corresponds to the corner 322b, of the first outer cover member 321 in a contact manner because the corner 322b of the second outer cover member 322 extends and is bent.

Accordingly, the coupling structure between the first outer cover member 321 and the second outer cover member 322 may be enhanced, and, at the same time, external foreign substances or moisture may be effectively prevented from being introduced into the battery module through the coupled portion.

Figure 6:
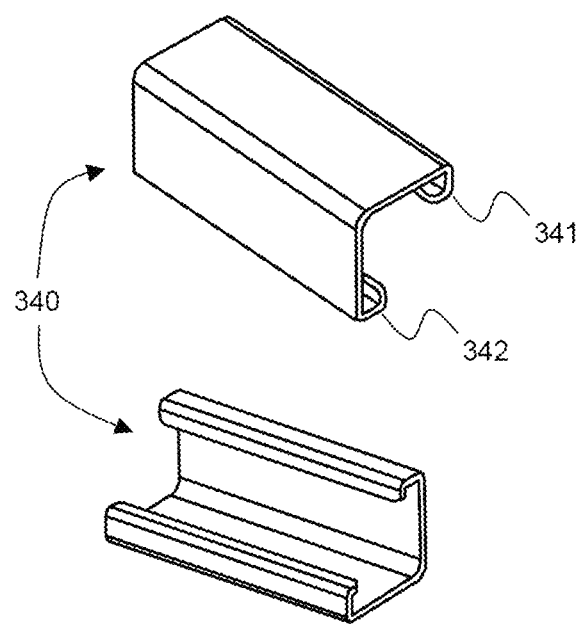
FIG. 6 is a schematic view illustrating a structure of the fastening member in FIG. 4.

FIG. 6 is a schematic view illustrating a structure of the fastening member in FIG. 4.

Referring to FIG. 6, a fastening member 340 has a bent plate-type structure in correspondence to the corners of the first and second outer cover members, which contact each other.

Accordingly, as the fastening member 340 is coupled to the corners of the first and second outer cover members in a close contact manner, the outer surface of the battery module may be further uniformly formed without excessive protrusion of the fastening member 340.

Each of the both ends 341 and 343 of the fastening member 340 has a hook structure that is bent inward two times.

Accordingly, when the both ends 341 and 342 of the fastening member 340 are respectively inserted into the fastening grooves of the first and second outer cover members, the both ends may be prevented from being escaped from the fastening grooves, and the coupling structure between the first and second outer cover members may be stably maintained.

Figure 7:
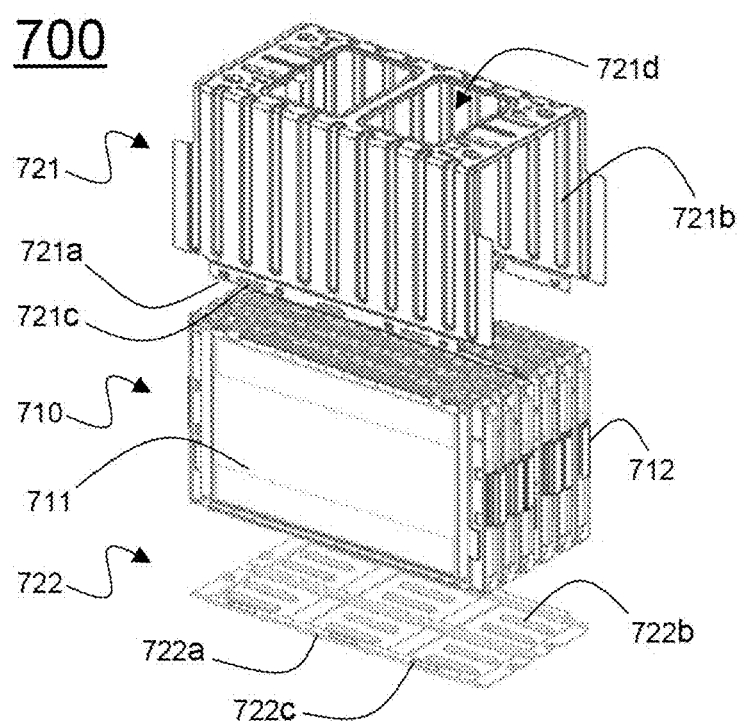
FIG. 7 is a schematic view illustrating a structure of outer cover members constituting a battery module in accordance with another exemplary embodiment.

FIG. 7 is a schematic view illustrating a structure of outer cover members constituting a battery module in accordance with another exemplary embodiment.

Referring to FIG. 7, a battery module 700 includes a battery cell assembly 710 and an outer cover member surrounding an outer surface of the battery cell assembly 710.

The battery cell assembly 710 has a structure in which a plurality of battery cells 711 are arranged in a direction of one surface while being electrically connected to each other through electrode terminals 712 and, overall, has a hexahedral structure. A first outer cover member 721 and a second outer cover member 722 are coupled to have a structure surrounding the rest outer surfaces except for first and second surfaces facing each other with reference to a protruding direction of the electrode terminal 712 of the battery cell 711 constituting the battery cell assembly 710.

The first outer cover member 721 has a bent plate-type structure bent in a ⊏-shape on a vertical cross-section to consecutively surround front, top, and bottom surfaces, which are adjacent to each other, among the rest outer surfaces except for the first and second surfaces of the battery cell assembly 710.

An opening 721*d* is perforated in a top surface of the first outer cover member 721 in a state in which an external device electrically connected to the battery cell assembly 710 is mounted so that the opening is exposed to the outside of the first outer cover member from the ground.

The second outer cover member 722 has a single plate-type structure to surround the rest bottom surface except for the front, top, and bottom surfaces surrounded by the first outer cover member 721 among the rest outer surfaces except for the front and rear surfaces of the battery cell assembly 710.

Each of the first outer cover member 721 and the second outer cover member 722 includes a plurality of reinforcement beads 721*b* and 722*b* for reinforcing strengths of the first and second outer cover members 721 and 722.

As both ends of the fastening member, which face each other, are respectively inserted into the corresponding corners 721*a* and 722*a* of the first and second outer cover members 121 and 122, fastening grooves 721*c* and 722*c* each having a slit shape are perforated in corresponding positions.

As described above, as the first and second outer cover members are coupled by the fastening member in the clamping manner, the battery module in accordance with the exemplary embodiment may prevent damages on the battery cell assembly caused by missiles or spark that may be generated in a welding process for coupling the outer cover members and fire and explosion of the battery cell assembly caused by the damages. Accordingly, the safety on a working circumstance may be enhanced, and the additional design or process for setting the welding portion may not be required. Thus, the battery module may be further easily manufactured, and the time and costs required for manufacturing the battery module may be saved.

What is claimed is:

1. A battery module comprising:
a battery cell assembly in which a plurality of battery cells are arranged while being electrically connected; and
first and second outer cover members each having a plate-type structure surrounding an outer surface of the battery cell assembly and coupled to each other by a fastening member in a state in which corners corresponding to each other are in contact with each other,
wherein each of the first and second outer cover members comprises at least one fastening groove having a slit shape, and the fastening grooves of the first and second outer cover members are perforated at positions corresponding to each other of corners contacting each other, and
the first and second outer cover members are coupled to each other in such a manner that both side ends, which face each other, of the fastening member are respectively inserted into the fastening grooves in a clamping manner.

2. The battery module of claim 1, wherein the battery cell assembly has a hexahedral structure in which a plurality of battery cells are arranged in a direction of one surface while facing each other, and the first and second outer cover members are coupled to surround the rest outer surfaces except for first and second outer surfaces facing each other with reference to a protruding direction of an electrode terminal of each of the battery cells among the outer surfaces of the battery cell assembly.

3. The battery module of claim 2, wherein an electric connection member electrically connected to the electrode terminal of the battery cell is disposed on the first and second outer surfaces, which face each other, of the battery cell assembly.

4. The battery module of claim 2, wherein the first outer cover member has a plate-type structure bent in a ⊏-shape on a vertical cross-section so as to consecutively surround three outer surfaces adjacent to each other among the rest outer surfaces except for the first and second outer surfaces of the battery cell assembly, and the second outer cover member has a single plate-type structure surrounding the rest one outer surface except for the three outer surfaces surrounded by the first outer cover member among the rest outer surfaces except for the first and second outer surfaces of the battery cell assembly.

5. The battery module of claim 2, wherein each of the first and second outer cover members has a plate-type structure bent in a ∟-shape so as to consecutively surround two outer surfaces adjacent to each other among the rest outer surfaces except for the first and second outer surfaces of the battery cell assembly.

6. The battery module of claim 1, wherein the first and second outer cover members extend and are bent so that an end of at least one corner overlaps an end of the rest corner among the corners contacting each other.

7. The battery module of claim 1, wherein the fastening member has a bent plate-type structure in correspondence to the corners of the first and second outer cover members, and each of both ends of the fastening member, which are respectively inserted into fastening grooves of the first and second outer cover members, has a hook structure bent inward to be prevented from being escaped from the fastening grooves.

8. The battery module of claim 1, wherein the fastening member is made of a metal material or a composite material, which has elasticity.

9. The battery module of claim 1, wherein, in a state in which one end of the fastening member is inserted into the fastening groove defined in the corner of the first or second outer cover members, as the other side end facing the one end is forcedly inserted into the fastening groove defined in the corner of the first or second outer cover member contacting the corner, the fastening member is coupled to the fastening groove in a clamping manner.

10. The battery module of claim 1, wherein the fastening groove is spaced by a distance that is 1% to 20% of a width of one surface of the corresponding outer cover member from an end of each of the corners of the outer cover members contacting each other.

11. The battery module of claim 1, wherein a groove having a shape corresponding to outer surfaces of the arranged battery cells so that the arrangement state of the battery cells is fixed and supported in a state in which the battery cells constituting the battery cell assembly face each other is defined in an inner surface of at least one of the first and second outer cover members.

12. The battery module of claim 1, wherein at least one of the first and second outer cover members comprises a reinforcement bead for reinforcing a strength of the outer cover member.

13. The battery module of claim 1, wherein at least one of the first and second outer cover members comprises at least one opening so that the outer cover member is exposed to the outside in a state in which an external device electrically connected to the battery cell assembly is mounted.

14. The battery module of claim 13, wherein the external device comprises at least one selected from the group consisting of a detector configured to detect abnormality of the battery cell assembly, a controller configured to control an electric connection state of the battery cell assembly, or a conversion regulator configured to convert and regulate a voltage and a current of the battery cell assembly.

15. A device comprising the battery module of claim 1 as a power source.

* * * * *